(12) United States Patent
Burkman

(10) Patent No.: US 12,519,152 B2
(45) Date of Patent: Jan. 6, 2026

(54) TRACTION BATTERY CONDUIT AND THERMAL BRIDGE ASSEMBLY

(71) Applicant: Ford Global Technologies, LLC, Dearborn, MI (US)

(72) Inventor: Wesley Burkman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 995 days.

(21) Appl. No.: 17/675,224

(22) Filed: Feb. 18, 2022

(65) Prior Publication Data

US 2023/0268576 A1    Aug. 24, 2023

(51) Int. Cl.

| | |
|---|---|
| *H01M 10/625* | (2014.01) |
| *B60L 58/26* | (2019.01) |
| *H01M 10/613* | (2014.01) |
| *H01M 10/6556* | (2014.01) |
| *H01M 10/6568* | (2014.01) |
| *H01M 50/502* | (2021.01) |

(52) U.S. Cl.
CPC ........... *H01M 10/625* (2015.04); *B60L 58/26* (2019.02); *H01M 10/613* (2015.04); *H01M 10/6556* (2015.04); *H01M 10/6568* (2015.04); *H01M 50/502* (2021.01); *H01M 2220/20* (2013.01)

(58) Field of Classification Search
CPC ............ H01M 10/625; H01M 10/613; H01M 10/6556; H01M 10/6568; H01M 10/6567; H01M 10/6553; H01M 10/653; H01M 10/615; H01M 10/654; H01M 10/6554; H01M 50/502; H01M 50/505; H01M 2220/20; B60L 58/26; B60L 50/64; Y02E 60/10
See application file for complete search history.

(56) References Cited

U.S. PATENT DOCUMENTS

| | | | | |
|---|---|---|---|---|
| 5,733,145 | A | * | 3/1998 | Wood ................. H01R 13/5845 439/604 |
| 10,811,740 | B2 | | 10/2020 | Weicker et al. |
| 2016/0248133 | A1 | * | 8/2016 | Iqbal ................. H01M 10/6568 |

FOREIGN PATENT DOCUMENTS

| | | | | |
|---|---|---|---|---|
| DE | 102011118686 | B4 | | 5/2013 |
| DE | 102014213671 | A1 | * | 1/2016 .......... H01M 10/613 |
| DE | 102020006274 | A1 | * | 11/2020 .......... H01M 50/227 |
| DE | 102021002069 | A1 | | 11/2021 |
| WO | 202109632 | A1 | | 1/2021 |

OTHER PUBLICATIONS

Translation of DE-102014213671-A1 (Year: 2016).*
English Translation of DE-102020006274-A1 (Year: 2025).*

* cited by examiner

*Primary Examiner* — Niki Bakhtiari
*Assistant Examiner* — Madison Leigh Kyle
(74) *Attorney, Agent, or Firm* — David B. Kelley; Carlson, Gaskey & Olds, P.C.

(57) ABSTRACT

A traction battery assembly includes a conduit having an interior that carries a thermal management fluid. A thermal bridge extends into the conduit and spans across the interior from a first side of the conduit to an opposite, second side of the conduit. A traction battery thermal transfer method includes positioning a thermal bridge relative to a conduit such that the thermal bridge extends across an interior of the conduit from a first side of the conduit to an opposite, second side of the conduit, and moving a thermal management fluid through the conduit to exchange thermal energy with the thermal bridge.

18 Claims, 5 Drawing Sheets

TRACTION BATTERY CONDUIT AND THERMAL BRIDGE ASSEMBLY

TECHNICAL FIELD

This disclosure relates generally to a conduit for a traction battery and, more particularly, to a conduit used to convey a thermal management fluid.

BACKGROUND

A battery pack of an electrified vehicle can include groups of battery cells arranged in one or more battery arrays. Busbars can be used to distribute electrical power to and from the battery cells, and to and from the traction battery pack. Fluid can be used to manage thermal energy levels within the busbars and other components of the traction battery pack.

SUMMARY

In some aspects, the techniques described herein relate to a traction battery assembly, including: a conduit having an interior that carries a thermal management fluid; and a thermal bridge extending into the conduit and spanning across the interior from a first side of the conduit to an opposite, second side of the conduit.

In some aspects, the techniques described herein relate to a traction battery assembly, wherein the thermal bridge is part of a busbar.

In some aspects, the techniques described herein relate to a traction battery assembly, wherein the thermal bridge is positioned in the interior such that the thermal management fluid can move through the conduit over a first side of the thermal bridge, and through the conduit over an opposite, second side of the thermal bridge.

In some aspects, the techniques described herein relate to a traction battery assembly, wherein the conduit has a circular cross-section.

In some aspects, the techniques described herein relate to a traction battery assembly, further including a seal between the thermal bridge and the conduit, the seal configured to seal the thermal management fluid inside the conduit.

In some aspects, the techniques described herein relate to a traction battery assembly, wherein the seal electrically isolates the thermal bridge from the thermal management fluid.

In some aspects, the techniques described herein relate to a traction battery assembly, wherein the seal seals the thermal management fluid inside the conduit.

In some aspects, the techniques described herein relate to a traction battery assembly, wherein the conduit is a polymer-based material, and the thermal bridge is a metal or metal alloy.

In some aspects, the techniques described herein relate to a traction battery assembly, wherein the conduit is overmolded to the thermal bridge.

In some aspects, the techniques described herein relate to a traction battery assembly, further including a port of the conduit and a shelf of the conduit, wherein the thermal bridge extends through the port to the interior of the conduit, wherein the thermal bridge extends from the port, across the interior, into the shelf.

In some aspects, the techniques described herein relate to a traction battery thermal transfer method, including: positioning a thermal bridge relative to a conduit such that the thermal bridge extends across an interior of the conduit from a first side of the conduit to an opposite, second side of the conduit; and moving a thermal management fluid through the conduit to exchange thermal energy with the thermal bridge.

In some aspects, the techniques described herein relate to a method, wherein the thermal bridge is part of a busbar.

In some aspects, the techniques described herein relate to a method, wherein, during the moving, the thermal management fluid moves through the conduit over a first side of the thermal bridge, and through the conduit over an opposite, second side of the thermal bridge.

In some aspects, the techniques described herein relate to a method, further including cooling the thermal bridge during the moving.

In some aspects, the techniques described herein relate to a method, wherein the interior is circular.

In some aspects, the techniques described herein relate to a method, further including using a seal to electrically isolate the thermal bridge from the thermal management fluid.

In some aspects, the techniques described herein relate to a method, further including sealing all interfaces between the conduit and the thermal bridge.

In some aspects, the techniques described herein relate to a method, further including, after the positioning and before the moving, flooding the interior with a sealant to coat portions of the conduit and the thermal bridge with sealant, and providing the sealing between the conduit and the thermal bridge using the sealant.

In some aspects, the techniques described herein relate to a method, further including overmolding the conduit to the thermal bridge.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Thermal energy levels in components of a traction battery pack can increase during operation. If the components cannot passively reject enough thermal energy, an active thermal management strategy using a thermal management fluid may be utilized. Exemplary embodiments of this disclosure facilitate active thermal management of components of traction battery packs.

Figure 1:
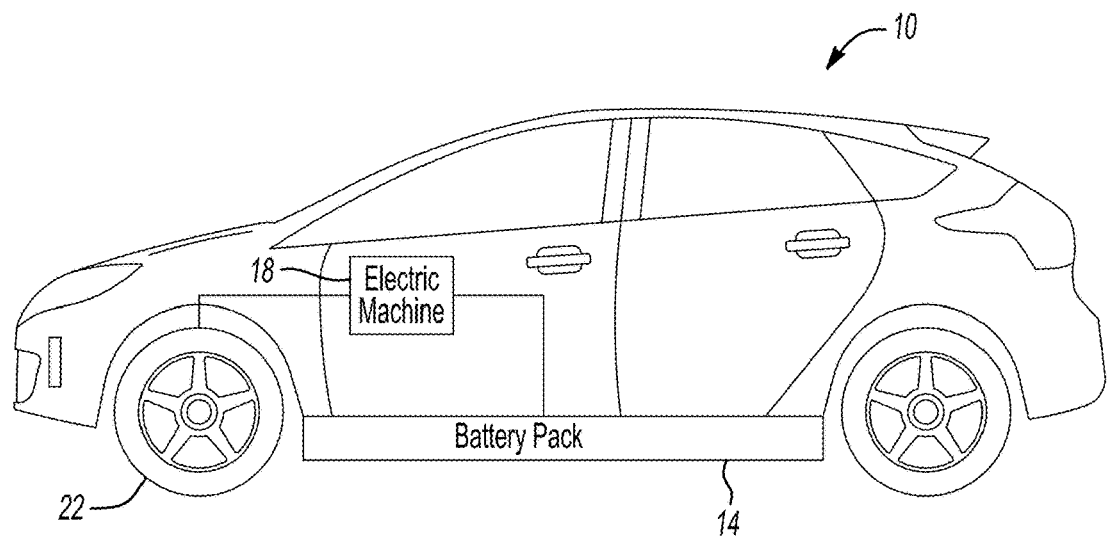
FIG. 1 illustrates a side view of an example electrified vehicle.

With reference to FIG. 1, an electrified vehicle 10 includes a traction battery pack 14, an electric machine 18, and wheels 22. The traction battery pack 14 powers the electric machine 18, which converts electric power to torque to drive the wheels 22.

The electrified vehicle 10 is an all-electric vehicle. In other examples, the electrified vehicle 10 is a hybrid electric vehicle, which selectively drives wheels using torque provided by an internal combustion engine instead, or in addition to, an electric machine. Generally, the electrified vehicle 10 could be any type of vehicle having a traction battery pack.

Figure 2:
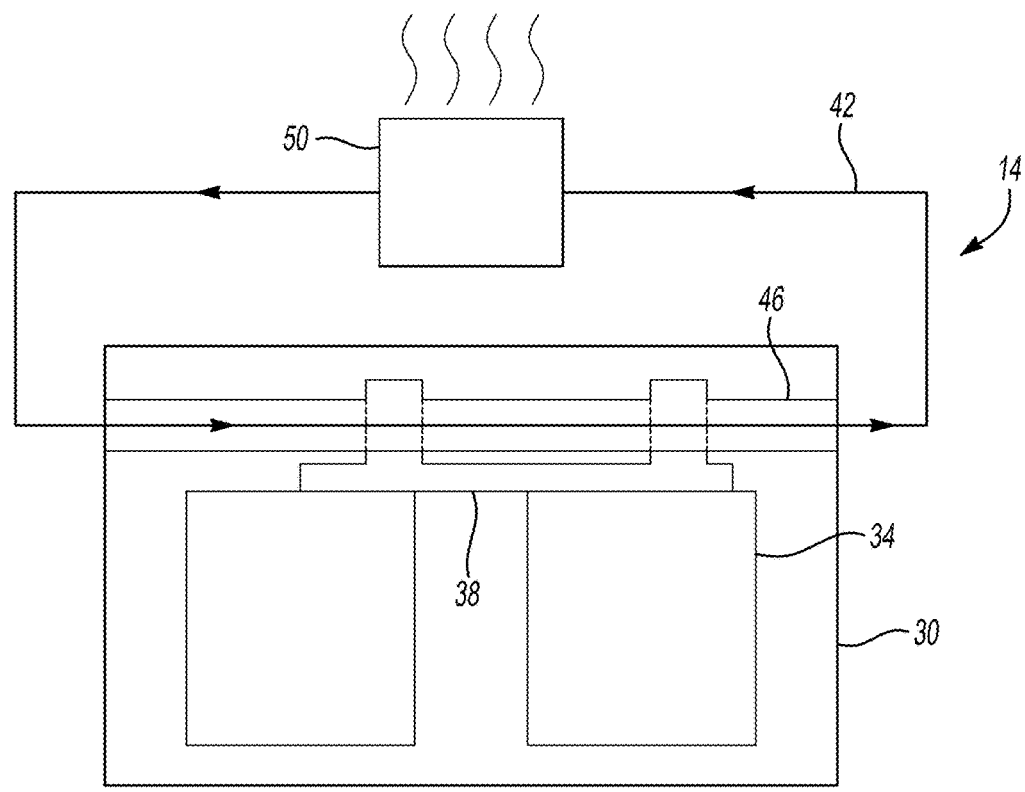
FIG. 2 illustrates a schematic view of a fluid circuit used within the electrified vehicle of FIG. 1.

Referring now to FIG. 2 with continuing reference to FIG. 1, the traction battery pack 14 includes an enclosure 30 that houses battery arrays 34 and at least one busbar 38. The enclosure 30 also houses other components, such as wiring, connectors, overcurrent protection devices, relays, and control modules.

The busbar 38 electrically couples the battery arrays 34. Other busbars could be used to electrically couple one or more of the battery arrays 34 to other components within the enclosure 30, or to components outside the enclosure 30.

Thermal energy levels within the at least one busbar 38 and other components of the traction battery pack 14 can increase during operation. A fluid circuit 42 extends into the traction battery pack 14 to manage the thermal energy levels.

Thermal management fluid moves along the fluid circuit 42. The thermal management fluid of the fluid circuit 42 is, in this example, used to cool the components of the traction battery pack 14. In another example, the thermal management fluid of the fluid circuit 42 could be used to heat the components of the traction battery pack 14.

Within the traction battery pack 14, the fluid circuit 42 includes a conduit 46 that carries thermal management fluid. The conduit 46 is configured to facilitate thermal energy transfer between various components of the traction battery pack 14 and the thermal management fluid.

In this example, after exiting the traction battery pack 14, the thermal management fluid moves along the fluid circuit 42 to a thermal energy exchange device 50, such as a radiator. At the thermal energy exchange device 50, thermal energy is transferred from the coolant to a surrounding environment.

Figure 3:
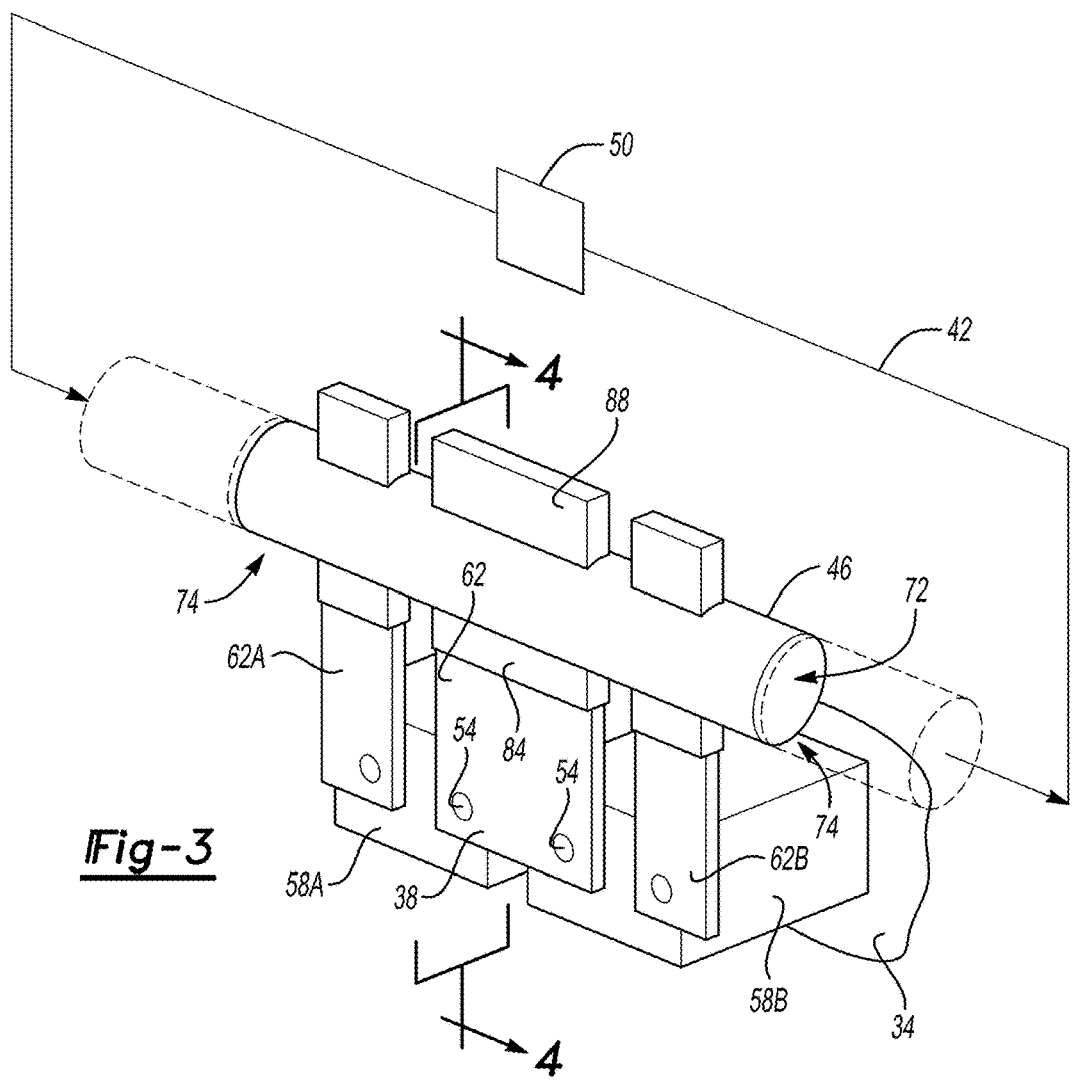
FIG. 3 illustrates a perspective view of a conduit and thermal bridges used with the fluid circuit of FIG. 2.
Figure 4:
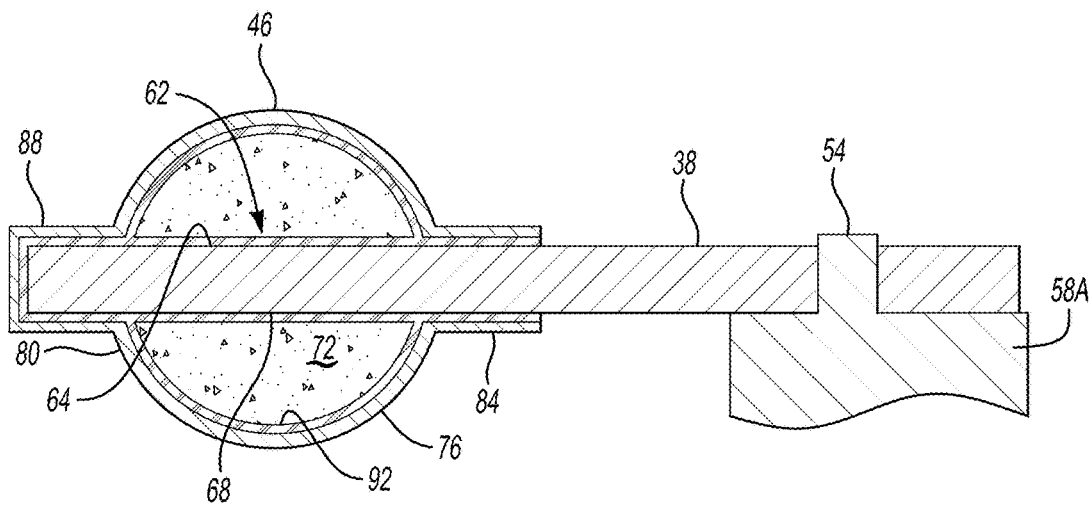
FIG. 4 illustrates a section view taken at line 4-4 in FIG. 3.

With reference now to FIGS. 3 and 4, the busbar 38 is directly connected to terminals 54 of relays 58A and 58B, which can be part of, or electrically coupled to, the battery arrays 34. The relays 58A and 58B are a type of traction battery component.

During operation of the traction battery pack 14, the busbar 38 can transfer electrical energy between the relays 58A and 58B of the battery arrays 34. Thermal energy levels in the busbar 38 and the relays 58A and 58B can increase during operation of the traction battery pack 14. In other examples, the relays 58A and 58B are another component, such as wiring or an overcurrent protection device.

To manage thermal energy levels, the busbar 38 includes a thermal bridge 62 extending into the conduit 46. Within the conduit 46, thermal management fluid flows over both a first side 64 of the thermal bridge 62 and an opposite, second side 68 of the thermal bridge 62. In this example, thermal energy moves from the thermal bridge 62 to the thermal management fluid within the conduit 46.

In this example, the thermal bridge 62 is a continuous and uninterrupted part of the busbar 38. Thermal energy moved from the thermal bridge 62 to the thermal management fluid cools the busbar 38.

The busbar 38 can be a metal or metal alloy. The busbar 38 is copper in this example. In another example, the busbar 38 is aluminum.

The conduit 46 in this example, receives a second thermal bridge 62A and a third thermal bridge 62B. In some examples, the thermal bridges 62A and 62B are part of a bus bar. In other examples, the thermal bridges 62A and 62B are not used to electrically connect components. The second thermal bridge 62A and the third thermal bridge 62B extend from other terminals of the relays 58A, 58B respectively.

The example conduit 46 is a polymer-based material that is electrically insulating, such as PA12 nylon. The example conduit 46 is molded and has a circular cross-section with an interior 72. Opposing ends 74 of the conduit 46 can have the same geometry as coolant port headers to facilitate quick-disconnect connections to a coolant system of the electrified vehicle 10 (FIG. 1).

The thermal bridge 62 extends into the interior 72 of the conduit 46. In particular, the thermal bridge 62 is positioned such that the thermal bridge 62 spans across the interior 72 from a first side 76 of the conduit 46 to an opposite, second side 80 of the conduit 46.

On the first side 76 of the conduit 46, the thermal bridge 62 extends through a port 84 of the conduit 46. The port 84 opens to the interior 72 and to an exterior of the conduit 46. The thermal bridge 62 extends from the port 84 across the interior 72 into a shelf 88. Unlike the port 84, the shelf 88 opens to the interior 72, but does not open to an exterior of the conduit 46.

In other example, the shelf 88 is replaced with a second port, which allows the thermal bridge 62 to extend through the second side 80 of the conduit 46 to the exterior. In such an example, the thermal bridge 62 could be used to electrically connect a component on the first side 76 to a component on the second side 80.

Spanning the thermal bridge 62 across the interior of the conduit 46 can facilitate thermal energy transfer and help to support the position of the busbar 38 in the conduit 46.

As shown in FIG. 4, a seal 92 is incorporated between the conduit 46 and the thermal bridge 62. The seal 92 seals all interfaces between the conduit 46 and the thermal bridge 62. The seal 92 blocks contact between the conduit 46 and the thermal bridge 62. The seal 92 also blocks contact between the thermal management fluid within the interior 72 and the thermal bridge 62.

The seal 92 has a relatively high dielectric resistance. The seal 92 electrically isolates the thermal bridge 62 from the thermal management fluid within the interior 72 and from the conduit 46. The prevents electrical connections between the thermal management fluid and the high-voltage systems of the traction battery pack 14.

In another example, the thermal management fluid is an electrically insulating coolant, such as an oil. In such an example, electrical isolation of the thermal bridge 62 from the thermal management fluid may not be required, and the seal 92 between the thermal bridge 62 and the thermal management fluid omitted.

Figure 5A:
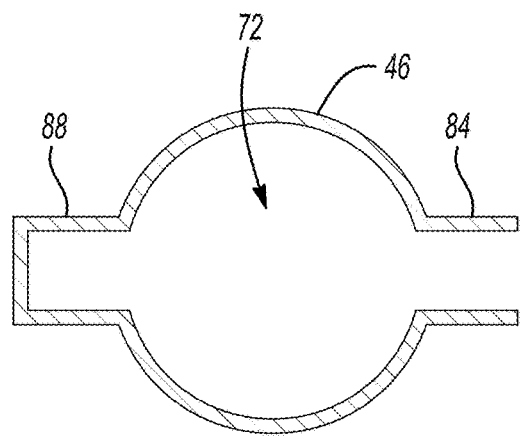
FIG. 5A-5D shown progressive stages of assembling the fluid conduit and thermal bridges according to an exemplary embodiment of the present disclosure.

With reference to FIGS. 5A-5D, a method of providing the seal 92 between the thermal bridge 62 and conduit 46 includes, as shown in FIG. 5A, first forming the conduit 46. The conduit 46 can be injection-molded, for example.

Figure 5B:
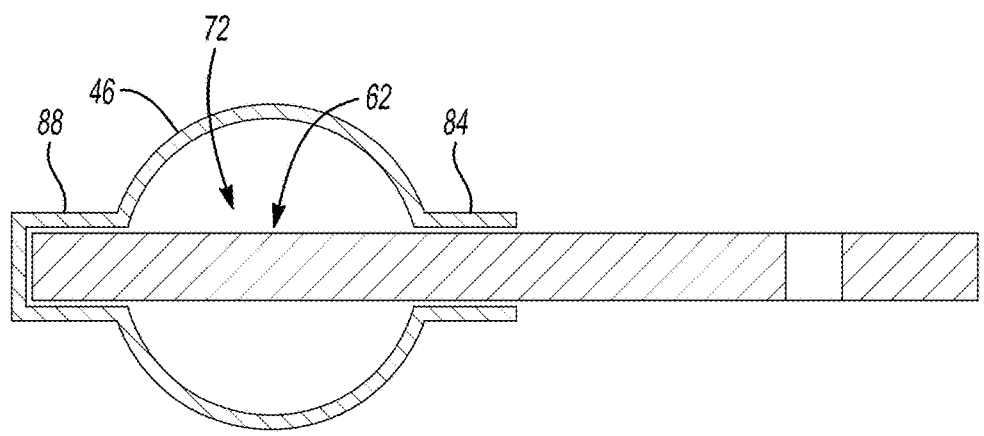
Figure 5C:
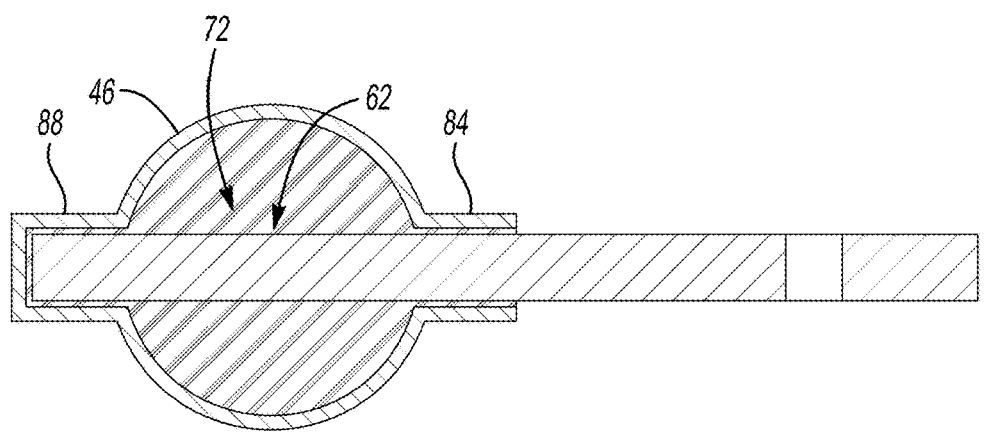

Next, as shown in FIG. 5B, the thermal bridge 62 of the busbar 38 is inserted through the port 84, across the interior 72, to the shelf 88. The interior 72 is then flooded with a sealant 96 in liquid form as shown in FIG. 5C.

Figure 5D:
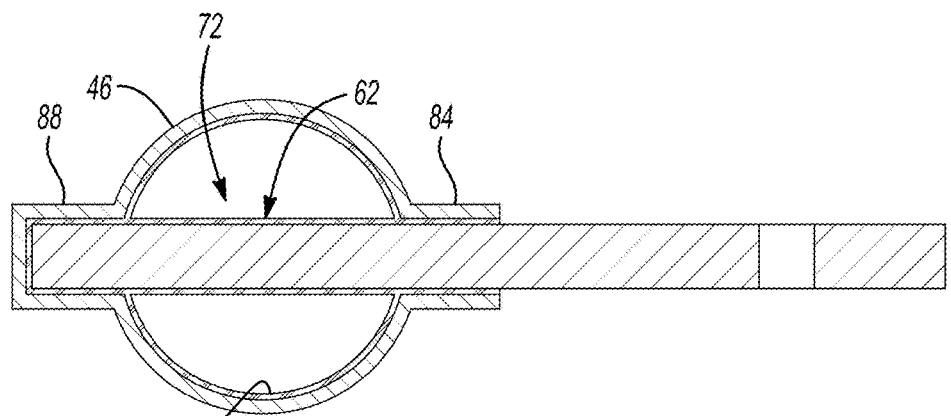

Some of the sealant 96 is then drained away as shown in FIG. 5D leaving behind a coating of the sealant 96 on portions of the conduit 46 and the thermal bridge 62. In this example, the coating is left on the interior surfaces of the conduit 46 and within the interfaces between the conduit 46 and the thermal bridge 62. The coating cures to provide the seal 92.

Figure 6A:
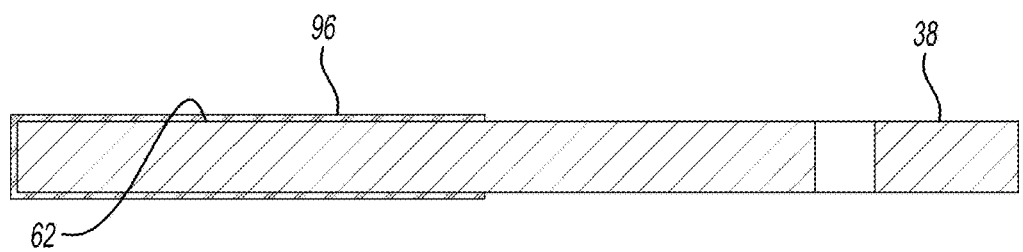
FIG. 6A-6B shown progressive stages of assembling the fluid conduit and thermal bridges according to another exemplary embodiment of the present disclosure.
Figure 6B:
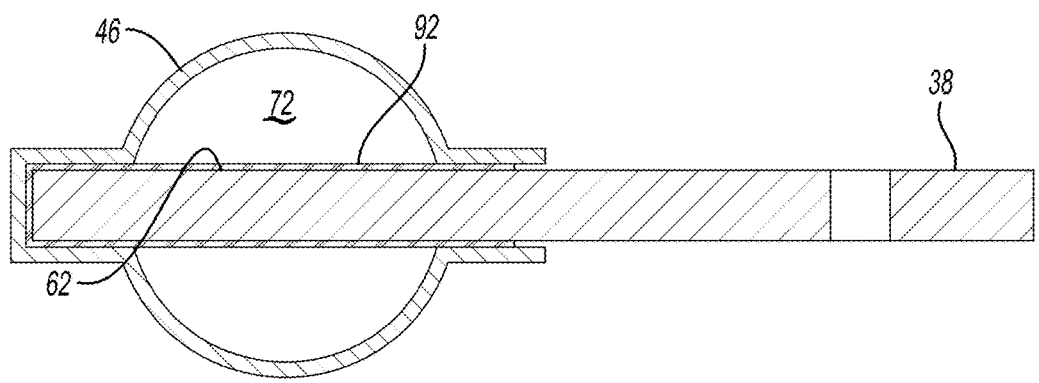

FIGS. 6A and 6B illustrate another technique for establishing the sealed relationship between the conduit 46 and the thermal bridge 62. Here, as shown in FIG. 6A, a sealant 96 coats the thermal bridge 62 of the busbar 38 prior to the thermal bridge 62 interfacing with the conduit 46. The sealant 96 of this disclosure can be an insulating polymer, a ceramic coating, or another type of electrically insulating material.

Next, as shown in FIG. 6B, the conduit 46 is overmolded to the thermal bridge 62 and the sealant 96. Opposing ends of the sealant 96 are captured between the conduit 46 and the thermal bridge 62 to provide the seal 92, which blocks thermal management fluid from leaking from the interior 72 and electrically isolates the thermal bridge 62 from the thermal management fluid. That is, the overmolding provides the sealing that keeps the thermal management fluid within the conduit 46.

Figure 7A:
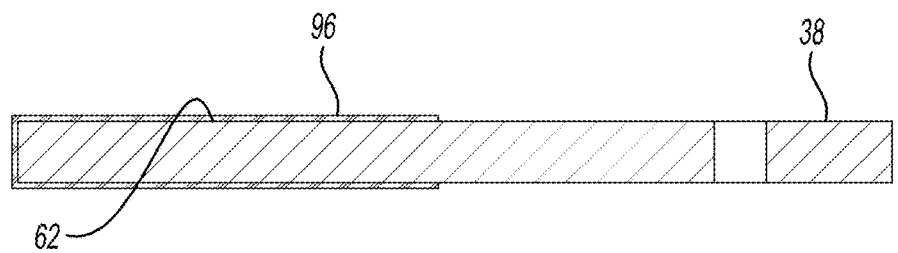
FIG. 7A-7D shown progressive stages of assembling the fluid conduit and thermal bridges according to yet another exemplary embodiment of the present disclosure.
Figure 7B:
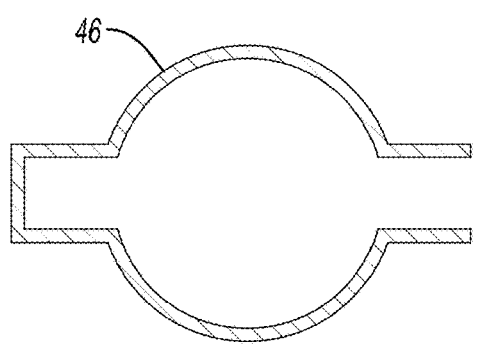
Figure 7C:
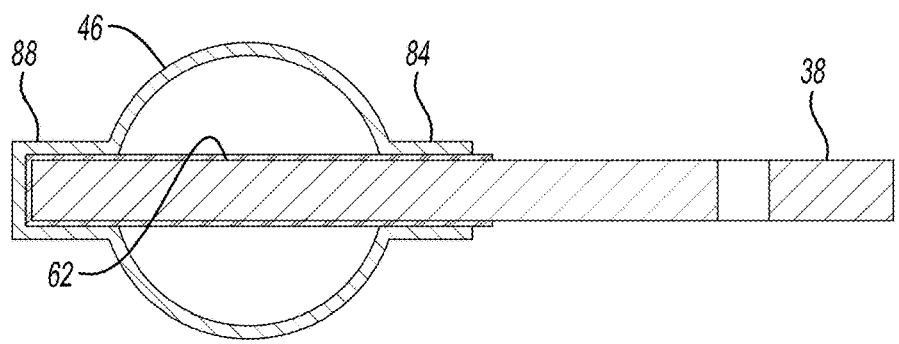
Figure 7D:
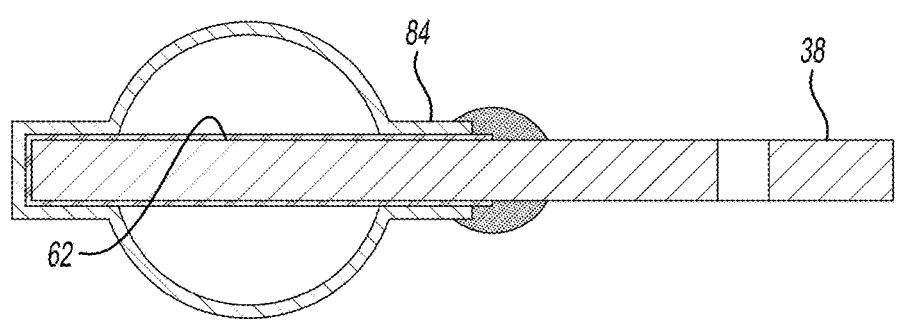

FIGS. 7A-7D show yet another approach for establishing the sealed relationship between the conduit 46 and the thermal bridge 62. In this example, the thermal bridge 62 of the busbar 38 is coated with the sealant 96 prior to the thermal bridge 62 interfacing with the conduit 46. The conduit 46 is formed as shown in FIG. 7B. The conduit 46 could be injection molded.

Next, the thermal bridge 62 coated with the sealant 96 is inserted through the port 84, across the interior 72, to the shelf 88. The sealant 96 provides the seal 92. Another sealing material 98, such as a silicone, is applied to the areas where the busbar 38 initially interfaces with the port 84 of the conduit 46. The sealing material 98 can further block leakage of thermal management fluid through this interface.

Features of some of the disclosed examples include maintaining electrical isolation between a high-voltage system of a traction battery pack and a thermal management fluid, which is connected to a chassis ground. The electrical isolation can be accomplished with a thin electrical insulating coating on the busbars. Another feature includes sealing the thermal management fluid using a conduit that houses at least one busbar and seal off an exposed end of the busbar.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery assembly, comprising:
   a conduit having an interior that carries a thermal management fluid; and
   a thermal bridge extending into the conduit and spanning across the interior from a first side of the conduit to an opposite, second side of the conduit, the thermal bridge extending into the conduit and spanning across the interior in a direction that is transverse to a direction of flow of the thermal management fluid through the interior of the conduit, wherein the thermal bridge bisects the interior.

2. The traction battery assembly of claim 1, wherein the thermal bridge is part of a busbar.

3. The traction battery assembly of claim 1, wherein the conduit has a circular cross-section.

4. The traction battery assembly of claim 1, further comprising a seal between the thermal bridge and the conduit, the seal configured to seal the thermal management fluid inside the conduit.

5. The traction battery assembly of claim 4, wherein the seal electrically isolates the thermal bridge from the thermal management fluid.

6. The traction battery assembly of claim 1, wherein the conduit is overmolded to the thermal bridge.

7. A traction battery assembly, comprising:
   a conduit having an interior that carries a thermal management fluid;
   a thermal bridge extending into the conduit and spanning across the interior from a first side of the conduit to an opposite, second side of the conduit; and
   a port of the conduit and a shelf of the conduit, wherein the thermal bridge extends through the port to the interior of the conduit, wherein the thermal bridge extends from the port, across the interior, into the shelf.

8. A traction battery thermal transfer method, comprising;
   positioning a thermal bridge relative to a conduit such that the thermal bridge extends across an interior of the conduit from a port on a first side of the conduit to an opposite, second side of the conduit such that the thermal bridge bisects the interior of the conduit; and
   moving a thermal management fluid through the conduit to exchange thermal energy with the thermal bridge.

9. The method of claim 8, wherein, during the moving, the thermal management fluid moves through the conduit over a first side of the thermal bridge, and through the conduit over an opposite, second side of the thermal bridge.

10. The method of claim 8, further comprising cooling the thermal bridge during the moving.

11. The method of claim 8, wherein the interior is circular.

12. The method of claim 8, further comprising using a seal to electrically isolate the thermal bridge from the thermal management fluid.

13. The method of claim 8, further comprising sealing all interfaces between the conduit and the thermal bridge.

14. The method of claim 13, further comprising, after the positioning and before the moving, flooding the interior with a sealant to coat portions of the conduit and the thermal bridge with sealant, and providing the sealing between the conduit and the thermal bridge using the sealant.

15. The method of claim 8, further comprising overmolding the conduit to the thermal bridge.

16. The traction battery assembly of claim 1, wherein the first side is a first radial side of the conduit, wherein the second side is a second radial side of the conduit.

17. The method of claim 8, wherein the first side is a first radial side of the conduit and the second side is a second radial side of the conduit.

18. The method of claim 8, wherein the thermal bridge extends across the interior to a shelf on the second side of the conduit.

* * * * *